Sept. 10, 1940.    L. W. FRANKLEY    2,214,194
FLUID CONTROL DEVICE
Filed Oct. 10, 1938

INVENTOR
LAWRENCE W. FRANKLEY
BY HARRIS, KIECH, FOSTER & HARRIS
ATTORNEYS.

Patented Sept. 10, 1940

2,214,194

UNITED STATES PATENT OFFICE 2,214,194

FLUID CONTROL DEVICE

Lawrence W. Frankley, Hermosa Beach, Calif., assignor to Frankley-Smith Mfg. Co., Torrance, Calif., a corporation of California Application October 10, 1938, Serial No. 234,207

5 Claims. (Cl. 251—84)

My invention relates to fluid control devices with special reference to valves, flow beans, and the like that have passage or orifice walls of relatively short life.

In many practices valves and other control devices are employed for fluids that abrade or fluids that chemically attack orifice walls in the control devices to such an extent that frequent renewal or replacement of wall members is necessary. For example, in the oil well art, control devices for sand-laden oil or for rotary mud laden with drilling debris are subject to such concentrated wear wherever the flow is restricted by orifices in the control devices that it is common practice periodically either to replace the control devices bodily or to replace orifice members of the control devices.

In the replacing of orifice members in the usual practice, it has been necessary to shut off flow entirely during the servicing procedure or to by-pass the flow temporarily, the by-passed flow not being subject to the same control as normal flow. One of the primary objects of my invention is to advance the art by providing a control device that may be readily serviced to the extent of replacement of an orifice member without suspending flow during the servicing period and without change in flow control. More specifically, I propose a control device so constructed that during the period one orifice member is being replaced, flow is by-passed through a second similar orifice member, which second orifice member may in turn be replaced by again changing the course of flow through the device. In achieving this object I have the further object of providing a movable control body carrying a plurality of orifice members arranged for movement selectively to a flow position and to a servicing position, the orifice members being so spaced that when one orifice is at a servicing position for replacement, a second orifice member is simultaneously at a flow position to serve as passage means for the fluid being conducted through the device.

In the preferred form of my invention in which my conception is incorporated in a valve construction, it is my object to have the movable control body carrying the orifice members serve as a valve member to cut off flow when no orifice member is at the flow position. The advantage of such a construction is that while the valve is in its "off" position, an orifice member may be replaced at the servicing position without dismantling the valve.

In the preferred form of my invention it is my object to provide a movable control member having a plurality of passages in combination with one or more orifice members and one or more closure members, which orifice members and closure members may be interchangeably mounted in the passages of the control member.

Another object of my invention is to make provision for sealing off an orifice member being serviced from the fluid stream without precluding movement of orifice members between the servicing position and the flow position. I propose to employ pressure from the fluid medium to make the seal effective against the fluid stream. Important features of my invention reside in the arrangement for achieving this latter purpose.

A further object in mind is to provide a construction in which not only orifice members but also sealing members may be replaced in the fluid control device without discontinuing flow through the device during the course of the servicing operation.

The above and other objects and advantages of my invention will be apparent in the course of the following detailed description taken with my accompanying drawing.

Figure 1:
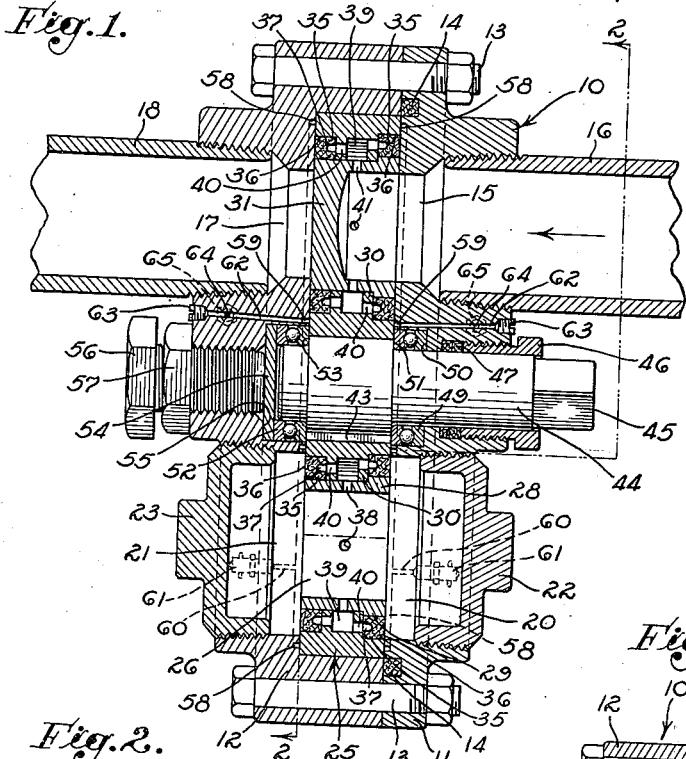
Fig. 1 is an axial section through one embodiment of my invention.
Figure 3:
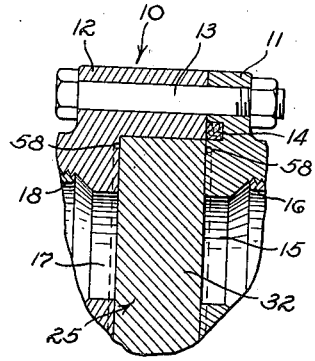
Fig. 3 is a fragmentary section showing how the device of Figs. 1 and 2 may be modified by omitting one of the passages of the control body.
Figure 2:
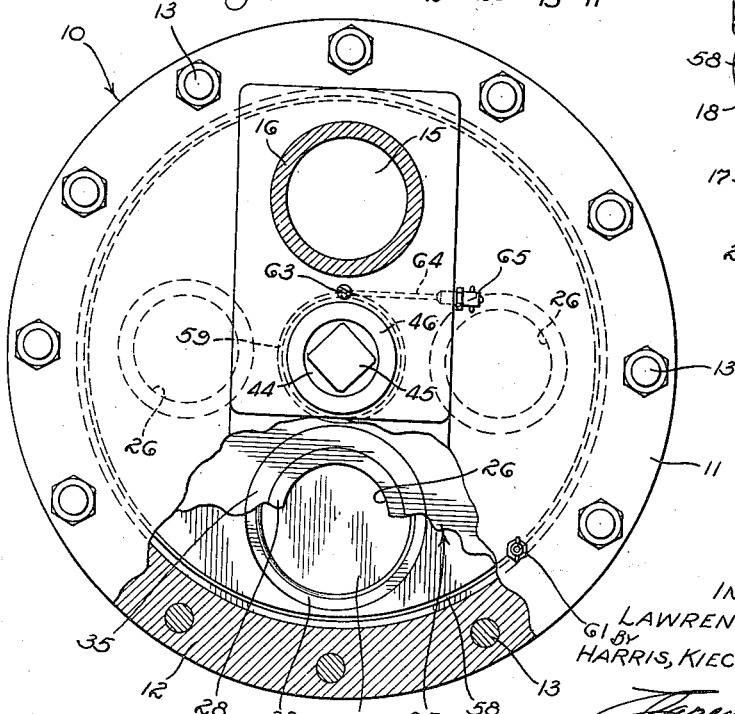
Fig. 2 is a side elevation partly in section taken as indicated by the line 2—2 of Fig. 1

The preferred form of my invention illustrated by Figs. 1 to 3 shows, by way of example, how my concept may be applied to the construction of a valve in a line for handling rotary mud in oil well drilling.

The valve includes a housing generally designated by numeral 10 that is formed in two complementary sections 11 and 12 held together by an annular series of bolts 13. Preferably, a packing ring 14 seals the joint between the two sections. The valve housing has an inlet port 15 threaded to receive an inlet pipe 16 and has an outlet port 17 threaded to receive an outlet pipe 18, the two ports being, in this particular embodiment of my invention, in axial alignment. The housing also provides at least one service port, the drawing showing two service ports 20 and 21 having a common axis. Preferably, the service ports 20 and 21 are threaded to receive closure plugs 22 and 23 respectively.

The valve housing 10 provides a circular chamber or seat to retain a complementary rotary control body 25. It is contemplated that the control body 25 will have a plurality of apertures or flow passages 26 that may be carried by rotation of the body 25 either to a position registering with the two fluid ports 15 and 17 or to a position accessible through the service ports 20 and 21, in this specific embodiment there being four such passages. It is further contemplated that the passages 26 in the rotary control body will be so located and spaced apart with respect to the locations of the fluid ports 15 and 17 and the service ports 20 and 21 of the valve housing 10 that one of the passages 26 will be in a position to pass fluid between the two fluid ports while a second passage 26 will be accessible through one of the service ports 20 and 21, whereby one of the passages may be serviced while fluid is flowing through the valve in the normal manner.

At least some of the flow passages 26 of the body 25 retain and are protected by removable orifice members 28, which, in the form of my invention being described, comprise liners to take the wear of fluid flowing through the valve. Each of the liners may be slightly enlarged at one end to provide a shoulder 29 to seat against a complementary annular shoulder 30 in the passage 26, the abutment of the two shoulders fixing the longitudinal position of the liner with respect to the passage. It is important to note that each of the orifice members 28 is dimensioned to pass readily through one of the service ports 20 or 21.

Since the form of my invention shown in Figs. 1 to 3 is a valve, it is required that at some rotary position of the control body 25 fluid flow between the inlet port 15 and the outlet port 17 be cut off. For this purpose I may provide a closure member in the form of a cup-shaped plug 31 shaped and dimensioned to be interchangeable with the orifice members 28 in any one of the flow passages 26. It should be noted, in passing, however, that the rotary body 25 may be constructed with a blank portion of sufficient extent to serve as means for cutting off flow through the valve. Thus, I may omit one of the passages 26 shown in Fig. 2 to provide, as indicated in Fig. 3, a blank portion 32 of the rotary body 25 for effectively separating the two fluid ports of the housing 10 when desired.

In this particular form of my invention for service with relatively high fluid pressures, I contemplate employing a pressure-responsive sealing means whereby the sealing efficiency will increase with the pressure of the fluid being opposed by the seal. Such a sealing means may include a pair of sealing rings 35 of rubber or other suitable resilient material effective between the rotary control body 25 and the housing 10 around each of the flow passages 26. In the construction shown, the sealing rings 35 are seated in complementary annular recesses 36 in the plane faces of the rotary control body 25 and are readily accessible for replacement through the service ports 20 and 21. Preferably, the inner faces of the sealing rings 35 are formed with annular grooves 37 so that the rings are U-shaped in cross-sectional configuration, whereby fluid pressure exerted in the grooves tends both to force the rings outward against the housing 10 and to expand the rings in cross-section.

Any suitable passages may be provided for transmitting pressure from the controlled fluid to the inner faces of the sealing rings. For example, pressure may be transmitted through radial apertures 38 in the orifice members 28 into an annular recess 39 surrounding the orifice member and hence by short passages 40 to the ring recesses 36 against the inner faces of the sealing rings. It is to be noted that the cup-shaped plug 31 has an aperture or apertures 41 for transmitting pressure to the sealing members in the same manner, the plug being so disposed that such pressure is received from the upstream side of the valve when the valve is in the closed position, as indicated in Fig. 1.

The control body 25 may be adapted for manual rotation in any suitable manner. For example, as shown in the drawing, the rotary control body 25 may be splined by a key 43 to a spindle 44 that extends to the exterior of the housing 10 and terminates in a square head 45 to receive a wrench. The spindle 44 extends through a packing gland 46 that retains suitable packing material 47. On one side of the rotary control body 25 a ball-bearing 49 is interposed between an annular shoulder 50 of the housing 10 and an annular shoulder 51 of the spindle 44; and on the other side of the rotary body a second ball-bearing 52 is retained between an annular shoulder 53 of the spindle and a circular plate 54. The outward movement of the plate 54 is limited by a wall 55 of the housing. If desired, a cap screw 56 carrying a locknut 57 may be inserted in the housing for adjustable pressure against the outer face of the plate 54.

Preferably, the form of my invention shown in Figs. 1 to 3 will be adapted for lubrication from the exterior of the housing 10. For this purpose I propose to provide a pair of outer lubricant grooves 58 and a similar pair of inner lubricant grooves 59 in the housing 10 to lie against the end faces of the rotary body 25. A bore 60 leads from each of the outer grooves 58 to a suitable lubricant fitting 61 on the exterior of the housing. For transmission of lubricant to the inner lubricant grooves 59, I provide bores 62 in the housing 10 sealed at their outer ends by threaded plugs 63 and extending from the bores 62 I provide bores 64 that terminate in suitable lubricant fittings 65 on the exterior of the valve housing.

The operation of this form of my invention will be apparent from the foregoing description. In the normal open position of the valve, the abrasive action of the fluid passing through the valve is concentrated on whichever of the removable orifice members or liners 28 is in operative position. Whenever such liner becomes worn to excess, a wrench is applied to the end of the spindle 44 to rotate the worn liner into an inoperative position and simultaneously to bring a second liner into registry with the two fluid ports 15 and 17. If the rotary body 25 has only two flow passages 26, the only inoperative position in normal operation will be at the service port so that whenever a liner is rotated to an out-of-service position, it may be replaced at once. When more than two of the passages are provided in the rotary body 25, however, the service ports will represent only one of two or more out-of-service positions of the liners. In any case, however, the construction is to be such that it will always be possible to perform the operation of replacing one orifice member while normal flow continues through the valve through a second orifice member.

Whenever an orifice member 28 or a cup-shaped plug 31 is aligned with the two fluid ports of the valve, pressure is transmitted to the sealing rings to prevent any substantial leakage towards the service port of the valve. When a pair of sealing rings is carried by rotation of the body 25 from an operative position to an inoperative position accessible through the service ports of the valve and one of the service closure plugs 22 or 23 is removed, any excessively high pressure on the sealing rings is immediately removed since the apertures 38 of the orifice members thereupon serve as vents to the atmosphere.

It will be apparent to those skilled in the art that although I have described a fluid control device to be employed in oil well practice, the principles of my invention are applicable broadly to fluid control devices and may be employed with advantage in other industries. It is also to be noted that the specific form of my invention described in detail herein will suggest to those skilled in the art various changes and modifications that do not depart from the essence of my concept, and I reserve the right to all such changes and modifications that come within the scope of my appended claims.

I claim as my invention:

1. A fluid control device comprising: a housing having a service port and two fluid ports; a manually movable body mounted in said housing and having a plurality of fluid passage to be used selectively for communication between said fluid ports, said passages being so spaced that when one passage is in position to transmit fluid between said fluid ports another of said passages is accessible through said service port, whereby one of said passages may be serviced while fluid is flowing through another of said passages; an orifice member removably mounted in at least one of said passages for replacement through said service port; and sealing means surrounding each individual passage in which an orifice member is mounted to seal off said fluid ports from said service port when said passage is in use, said sealing means being responsive in sealing action to the pressure of the fluid controlled by the device.

2. A combination as set forth in claim 1 in which said sealing means includes sealing members accessible through said service port and dimensioned and adapted for replacement through said service port.

3. A fluid control device comprising: a housing having a fluid intake port, a fluid discharge port and a service port; a manually movable body mounted in said housing and having a plurality of fluid passages to be used selectively for communication between said fluid ports, said passages being so spaced that when one passage is in position to transmit fluid between said fluid ports another of said passages is accessible through said service port, whereby one of said passages may be serviced while fluid is flowing through another of said passages, said body being adapted at one position to cut off flow from said intake fluid port to said discharge port; an orifice member removably mounted in at least one of said passages for replacement through said service port; sealing means surrounding each individual passage in which an orifice member is mounted to seal off said fluid ports from said service port when said passage is in use, said sealing means being responsive in sealing action to the pressure of the fluid controlled by the device; and sealing means adapted to act between said casing and said body to seal off said intake fluid port from both said discharge fluid port and said service port when said movable body is at said cut-off position, said last-named sealing means being responsive in sealing action to the pressure of the fluid from said intake point.

4. A fluid control device comprising: a housing having a service port and two fluid ports; a manually movable body mounted in said housing and having a plurality of fluid passages to be used selectively for communication between said fluid ports, said passages being so spaced that when one passage is in position to transmit fluid between said fluid ports another of said passages is accessible through said service port, whereby one of said passages may be serviced while fluid is flowing through another of said passages; an orifice member removably mounted in at least one of said passages for replacement through said service port; and a continuous sealing means embracing said orifice member and adapted for axial expansion against the inner walls of said housing to seal off said fluid ports from said service port when said orifice member is in use, said sealing means being responsive in sealing action to the pressure of the fluid controlled by the device.

5. A fluid control device comprising: a housing having a service port and two fluid ports; a manually controlled body movably mounted in said housing and having a plurality of fluid passages to be used selectively for communication between said fluid ports, said passages being so spaced that when one passage is in position to transmit fluid between said fluid ports another of said passages is accessible through said service port, whereby one of said passages may be serviced while fluid is flowing through another of said passages; fluid-pressure-responsive sealing means effective between said housing and body to cut off at least one of said passages from said service port when said passage is in communication with said fluid ports; means for transmitting actuating pressure from the fluid controlled by the device to said sealing means; and means to cut off said actuating pressure to de-energize said sealing means when the sealing means is shifted to said service port.

LAWRENCE W. FRANKLEY.

CERTIFICATE OF CORRECTION.

Patent No. 2,214,194.                                September 10, 1940.

LAWRENCE W. FRANKLEY.

It is hereby certified that error appears in the printed specification of the above numbered patent requiring correction as follows: Page 3, first column, line 31, claim 1, for the word "passage" read --passages--; page 3, second column, line 19, claim 3, for the word "point" read --port--; and that the said Letters Patent should be read with this correction therein that the same may conform to the record of the case in the Patent Office.

Signed and sealed this 22nd day of October, A. D. 1940.

(Seal)

Henry Van Arsdale,
Acting Commissioner of Patents.